March 3, 1959

T. BACKUS 2,875,872

AUTOMOTIVE DEVICE

Filed Jan. 22, 1957

INVENTOR.
THOMAS BACKUS
BY
Woodhams Blanchard and Flynn
ATTORNEYS

United States Patent Office 2,875,872
Patented Mar. 3, 1959

2,875,872

AUTOMOTIVE DEVICE

Thomas Backus, Kalamazoo, Mich., assignor, by mesne assignments, to Fuller Manufacturing Company, a corporation of Delaware Application January 22, 1957, Serial No. 635,303

10 Claims. (Cl. 192—3.5)

This invention relates to transmission control mechanism and it particularly relates to apparatus for controlling a brake associated with the engine connected, or driven, end of a change gear system.

In effecting the shifting of conventional change gear systems requiring the disengagement and re-engagement of toothed elements as a part of a shift operation, and consequently requiring the synchronization of such toothed elements prior to their re-engagement, it has been conventional practice to apply driving means, such as the engine, for increasing the speed of the input or engine connected portion of the change gear system as an incident to a downshift operation. It has also been common practice to apply a braking, or other decelerating, device for reducing the speed of the engine connected portion of the change gear system as a part of an upshift operation. Such decelerating devices have been applied to the engine connected portion of the change gear system at many specific points, such as the driven side of the clutch, the input shaft of the transmission, the countershaft, the power takeoff driven from the countershaft or an idling gear which is in constant mesh with a countershaft gear. These various procedures are all well known to the prior art and are matters of choice, depending upon the requirements of the particular use.

In one common form of such control mechanism, which may be taken as illustrative of the problem, a brake is associated with the driven end of the clutch and is controlled by the clutch pedal. In this construction, a partial depression of the clutch pedal disengages the clutch, but does not operate the clutch brake. A substantially complete depression of the clutch pedal disengages the clutch and also applies the clutch brake. In either case, the clutch brake is released and the clutch re-engaged when the pedal resumes a substantially fully raised position.

In a hand shifted transmission, such a decelerating device and control therefor enable the driver to make an extremely rapid shift by reducing the speed of the engine connected portion of the transmission very quickly and thus bring the toothed elements into synchronization with each other more quickly than would occur in the absence of such an apparatus. Such apparatus has been utilized for a long time and is well known.

However, the utilization of such present apparatus requires a certain amount of skill and attention on the part of the driver and such skill and attention is not always forthcoming. For example, it is well known that the correct procedure for operating a pedal actuated control mechanism is to first depress the clutch pedal enough to release or disengage the clutch, then to operate the hand shift lever to move the transmission to neutral, and finally to depress the clutch pedal fully to apply the brake. However, in actual practice the driver will often depress the clutch pedal completely when the upshift is started, which applies the brake immediately with either or both of the two following results: (1) The brake, being applied to the engine connected portion of the transmission while the transmission is still in gear, acts against the inertia of the vehicle, which it is not built to withstand and, therefore, wears out very rapidly. (2) The brake, acting in opposition to the inertia of the vehicle, applies a heavy load onto the engaged, toothed elements and makes it extremely difficult at best to move the transmission out of its shifted position. Thus, the improper operation of conventional clutch brake controls often results both in excessive maintenance on such clutch brakes and in rendering the shift extremely difficult to perform.

Recognizing that no good purpose can be served by applying a brake to the engine connected portion of the transmission prior to the attainment of neutral position by the transmission gear elements, it appears desirable to correct the above indicated difficulties by controlling the application of such a brake in such a manner that it will not become effective until the transmission has actually reached neutral position.

Accordingly, the principal objects of the invention are:

(1) To provide a control for a speed decelerating device, such as a countershaft brake, associated with an engine connected part of a change gear system which may be preselected at will by the operator of a vehicle, but which will operate to apply a braking force to such part only when the gear system attains neutral position.

(2) To provide control mechanism, as aforesaid, which can be applied in such a manner as to give the driver more complete control over such decelerating device than is now available in conventional practice.

(3) To provide a control for such speed decelerating device which can be operated in precisely the same manner, insofar as the driver is concerned, as is now carried out by certain present conventional devices when properly operated and which will be impossible for the driver to operate otherwise.

(4) To provide control mechanism, as aforesaid, which will have an extremely high degree of reliability.

(5) To provide control mechanism, as aforesaid, which will be applicable to an extremely wide variety of specific transmission installations and brake mechanisms applicable thereto.

(6) To provide control mechanism, as aforesaid, which will be relatively inexpensive to add to present conventional equipment.

(7) To provide control mechanism, as aforesaid, which will have low maintenance requirements.

Other objects and purposes of the invention will be apparent to persons acquainted with apparatus of this general type upon a reading of the following specification and inspection of the accompanying drawings.

In the drawings:

Figure 3 is a schematic representative of an alternate embodiment of the invention.

For illustrative purposes, the description will proceed in connection with a selected control mechanism utilizing a countershaft brake, and in the operation thereof it will be assumed that the mechanism is used in connection with a road vehicle. However, it will be recognized that this is for illustrative purposes only and that the brake may, without departing from the scope of the invention, be applied at any portion of the transmission mechanism which is positively connected to the driven side of the clutch and that the transmission in which the apparatus is utilized may be employed in any of a wide variety of locations. Particularly, the apparatus of the invention is also applicable to dirt moving equipment or to other uses wherein a normal operating condition of high load and low speed make it extremely desirable that the upshifts be carried out as rapidly as possible.

*General description*

In general, the invention is carried out by utilizing a power actuated brake mechanism wherein the energization of such brake is carried out through the placement of two energy (pressure fluid or electrical) controlling devices in series with each other. One device is placed into energy conducting position by means controllable by the operator and the other energy controlling device is placed in energy conducting position when, and only when, the transmission attains its neutral position. Thus, in the case of a road vehicle, the first energy controlling device is placed in energy conducting position by manual (or pedal) actuation by the operator of a suitable control device which may be independently available to him or it may be associated with some other agency such as the clutch pedal, and the other energy controlling device may be placed in energy conducting position by suitable means associated with the shift rods of the transmission.

*Detailed construction*

As used herein; both hereinbefore and hereinafter, the term "engine connected end" of the transmission will be understood to mean those parts of the transmission which may be driven by the engine when the clutch is engaged and the transmission is in neutral, regardless of whether they are actually being so driven at a particular moment with respect to which the term is used, and as contrasted with the parts of the transmission which can be driven by the inertia of the vehicle when the transmission is in neutral.

Figure 1:
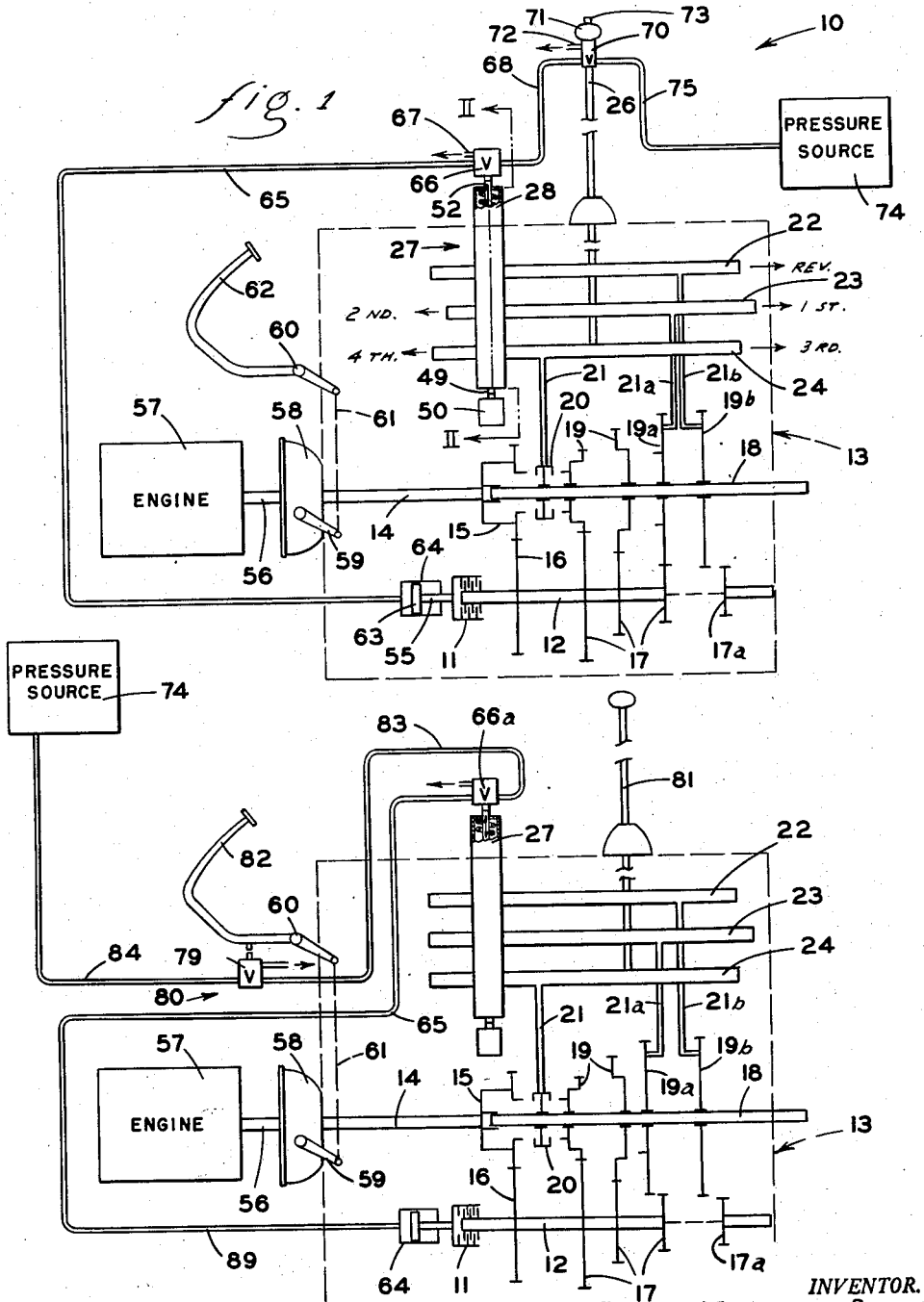
Figure 1 is a schematic view of one preferred embodiment of the invention.
Figure 2:
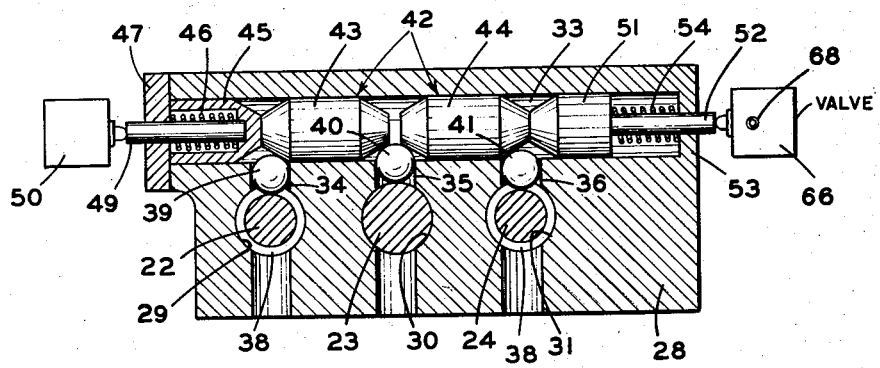
Figure 2 is a sectional view taken on the line II—II of Figure 1.

Referring first to Figures 1 and 2, there is shown apparatus giving the operator the maximum control over the brake consistent with the concept of permitting it to become actuated only when the transmission is in neutral position. In this embodiment, the manually actuable control is arranged for independent operation by the operator of the equipment and is in this particular case placed at the upper end of the vehicle shift lever.

As shown in Figure 1, the transmission control mechanism, to which this invention relates, is comprised of an energy control system 10 and a speed decelerating device, such as the countershaft brake 11, operable by said control system 10. The brake 11 is associated with an input portion, such as the countershaft 12, of a change gear system, such as a heavy duty vehicle transmission 13. The transmission 13 may be of conventional construction, such as substantially similar to the transmission disclosed and described in the United States Patent No. 2,637,221 and hence needs no extensive detailing.

Briefly, however, said transmission has an input shaft 14 which is connected to the countershaft 12 by means of the continuously meshed gears 15 and 16, mounted upon the shafts 14 and 12, respectively. The countershaft 12 is provided with a plurality of gears 17 which are rotatable therewith and connectable, one at a time, to the main shaft 18 of said transmission 13 in a conventional manner by means including the gears 19 and 19a supported upon said main shaft 18. The gears 19 are rotatable with respect to the main shaft 18 and in continuous mesh with corresponding gears 17 on the countershaft 12. The shiftable element 20, splined on said shaft 18 for axial movement therealong, is provided with effecting engagement between the forward (here leftward) one of said gears 19 and the shaft 18. The element 20 also serves alternately to connect the gear 15 to said shaft 18 for direct drive. A shift yoke 21 connected to the shift rod 24 effects the axial shifting of the element 20. The other gear 19 is connectable to the shaft 18 by the shiftable gear 19a which is splined on the shaft 18 and is alternatively engageable with a gear 17 on the shaft 12. A shift yoke 21a on the shift rod 23 effects the axial shifting of the gear 19a. The reverse gear 19b is shiftable along the shaft into engagement with the reverse gearing 17a. The shift rods are operable in a well known manner by means such as the conventional shift lever 26.

The actuator mechanism 27, which may be generally similar to that shown in Patent No. 2,775,901, is provided for actuating one of the two serially connected energy controlling devices by which the brake 11 is controlled. As shown particularly in Figure 2, the actuator mechanism 27 is comprised of an actuator housing 28, having three parallel rod openings 29, 30 and 31, through which the shift rods 22, 23 and 24, respectively, are slidably received so that their lengthwise axes lie substantially within a single plane. Said shift rod housing 28 also has an elongated, cylindrical actuator bar opening 33, which is disposed transversely of, and is spaced equidistantly from, the rod openings 29, 30 and 31. Said bar opening 33 is connected to the rod openings 29, 30 and 31 by three actuator ball openings 34, 35 and 36, respectively. The shift rods are each provided with an annular groove 38, having tapered axial end walls which diverge radially outwardly. Said groove 38 in each rod is aligned with its respective actuator ball opening when its corresponding shift rod is in the neutral position. Actuator balls 39, 40 and 41, which are receivable into the annular grooves 38, are slidably, but snugly, disposed within the ball openings 34, 35 and 36, respectively, so that they will extend at all times into the bar opening 33.

The actuator bar 42 is comprised of four cylindrical, actuator bar segments 45, 43, 44 and 51, which are slidably and snugly disposed within the bar opening 33. The bar segments 43 and 44 are respectively disposed between the ball openings 34 and 35, and 35 and 36. The bar segments 43 and 44 are each provided with conically-shaped end surfaces, which are engageable with the balls 39, 40 and 41. The length of the bar segments 43 and 44 is such that they will permit only one of the balls 39, 40 and 41 at a time to move out of its annular groove 38 and thus further into the bar opening 33. Thus, the bar segments 43 and 44 have the effect of permitting only one of said shift rods 22, 23 and 24 at a time to move out of its neutral position.

The first bar end segment 45 has one conical end surface which is adjacent to the segment 43 and engageable with the ball 39. Said end segment 45 is continuously and resiliently urged toward the bar segment 43 by a spiral spring 46, which is held under compression between said end segment 45 and the adjacent end wall 47 of the bar opening 33. Accordingly, the spring 46, operating through the bar segments 43, 44 and 45, will tend to urge the balls 39, 40 and 41 into their respective annular grooves 38 when all of the shift rods are in their neutral positions. An actuating pin 49 is secured to the bar end segment 45 and extends, preferably coaxially, therefrom through the spring 46 and an appropriate opening in the end wall 47, for the purpose of operating any desired means, such as the microswitch 50, which is associated with auxiliary equipment, such as an auxiliary transmission, not shown.

The second bar end segment 51, which may be substantially similar in shape to the first bar end segment 45, is slidably and snugly disposed within the bar opening 33, adjacent to the bar segment 44. Said second end segment 51 is provided with a conical end surface adjacent to said bar segment 44 and engageable with the ball 41. An actuating pin 52 is secured to, and preferably extends coaxially from, said end segment 51, through an appropriate opening in the other end wall 53 of said bar opening 33. Resilient means, such as the spiral spring 54, encircles the actuating pin 52 and is disposed between the end segment 51 and the end wall 53 for urging said end segment 51 toward the bar segment 44. Accordingly, if any one of the balls 39, 40 or 41 is moved further into the opening 33 as a result of a shift of the corresponding shift rod, the end segments will be simultaneously moved away from each other. Thus, their respective pins 49 and 52 will be extended through the respective adjacent end walls 47 and 53 against the contrary urging of the respective springs 46 and 54.

The input shaft 14 is connectable to the output shaft 56 of a conventional engine 57, through a clutch 58, which is disengaged by operation of a lever 59 in a substantially conventional manner. The clutch lever 59 is connected by linkage 61 to a clutch pedal 62 which is pivotally supported at 60 in a conventional manner.

The countershaft brake 11 may be of a conventional type, such as a brake having a plurality of interleaved plates, some of which are mounted upon and rotatable with said countershaft 12, and the remainder of which are non-rotatably mounted from engagement against the rotatable plates in response to movement of the rod 55 extending from the piston 63.

Said brake is controlled by suitable pressure fluid or electrical means, which are here shown as being of pressure fluid type for illustrative purposes. In this embodiment, the brake is operated by the pressure fluid actuated piston 63 disposed within the pressure cylinder 64, which is connected to a pressure supply conduit 65. The conduit 65 is, in turn, connected to a transmission responsive three-way valve 66, said valve having an exhaust 67. Said three-way valve 66 is arranged, in this particular embodiment, so that it normally connects the conduit 65 to the conduit 68. However, said valve 66 is positioned operatively adjacent the actuating pin 52, so that extension of said pin from the housing 28 will operate said valve 66 to connect the conduit 65 to the exhaust port 67. Thus, it will be seen that when the shift rods 22, 23 and 24, hence the actuator mechanism 27, are in the neutral position, the valve 66 will be connecting the conduit 65 to the conduit 68. However, when one of the shift rods 22, 23 and 24 is out of its neutral position, the transmission responsive valve 66 will connect the conduit 65 to the exhaust port 67 and close the conduit 68 at the valve 66.

The conduit 68 is also connected to the operator actuated three-way valve 70, which in this particular embodiment is supported upon the shift lever 26 adjacent to the manually engageable knob 71 at the upper end of said shift lever. A conduit 75 connects the valve 70 with a source 74 of pressure fluid. The valve 70 is arranged so that it normally closes the conduit 75 and connects the conduit 68 to the exhaust port 72 on said valve 70. A manually operable actuator 73, which is preferably disposed adjacent to, or on, the knob 71, is provided for moving the valve 70 into such a position that the conduit 68 is connected to said conduit 75 and the exhaust port 72 is closed. Thus, it will be seen that for pressure fluid to pass from the source 74 to the pressure cylinder 64, both the transmission actuated valve 66 and the manually actuated valve 70 must be moved, or permitted to move, out of their respective closed or energy blocking positions and into their open or energy conducting positions.

*Operation*

Referring now to the operation of the structure disclosed in Figures 1 and 2, it will be assumed, for the purpose of convenience in illustration, that the engine 57 is operating, that the clutch 58 is engaged, and that the transmission 13 is in first gear, so that the vehicle associated therewith is moving forwardly. Thus, one of the shift rods, here the shift rod 23 (Figure 2), will be in the shifted position, thereby causing its associated actuator ball 40 to operate through the bar segment 44 and bar end segment 51, to effect an extension of the actuating pin 52. Accordingly, the three-way valve 66 will be in an operated position connecting the conduit 65 to the exhaust port 67, and the conduit 68 will be blocked at the three-way valve 66. Thus, even if the operator actuated valve 70 is operated, thereby connecting the conduit 75 to the conduit 68, pressure fluid will be blocked by the valve 66 from flowing into the pressure cylinder 64.

When it becomes desirable to effect an upshift of the transmission 13, wherein use of the countershaft brake 11 will be desired, the operator may operate the valve 70 by depressing the actuator 73 prior to movement of the shift lever 26, which he will ordinarily do at about the same time that he depresses the clutch pedal 62 to disengage the clutch 58. The shift lever is then moved into its neutral position whereby the shift rod 23 is moved into its neutral position. When said shift rod 23 reaches its neutral position and the actuating pin 52 is thereby permitted to move away from the valve 66, said valve 66 will immediately open and connect the conduit 65 to the conduit 68, so that pressure fluid can then flow from the source 74 through the conduit 75, conduit 68 and conduit 65 to the pressure cylinder 64 and thereby apply the countershaft brake 11. Continued pressure on the shift lever 26 will effect shifting of the transmission 13 into its new gear position, as soon as synchronization has occurred in said transmission in an otherwise substantially conventional manner.

As soon as the shift rod involved in the next shift of the shifting operation moves out of the neutral position, the three-way valve 66 will again be operated, whereby the conduit 68 will be blocked and the conduit 65 will again be connected through said valve 66 to the exhaust port 67, thereby depressurizing the pressure cylinder 64 and releasing the countershaft brake 11. The depressed clutch pedal 62 is then released and the transmission 13 is again connected to the engine 57 in the new gear position. Thus, it will be seen that operation of the countershaft brake 11 is entirely independent of the operation of the clutch 58 and, even though such operation is initiated prior to the beginning of a shift, the brake will not be applied until the transmission has been placed in neutral.

It will be seen that the operator can release the actuator 73 of the valve 70 at any desired time, and thereby at will block the flow of pressure fluid from the source 74, while connecting the pressure cylinder 64 to the exhaust port 72 which results in a release of the countershaft brake 11 when the transmission 13 is in neutral position. This arrangement gives the operator added positive control over the shifting of the transmission 13 for such additional purposes as he may desire.

Particularly, it will be possible for the operator to close the manually actuated valve 70 while the transmission is still in neutral position and thereby to release the brake at any desired point prior to his proceeding with the shifting operation. Thus, if the driver is sufficiently skilled, he can release the brake while the engine driven parts of the transmission are still travelling more rapidly than the parts of the transmission connected to the output and thus while the parts to be synchronized are still approaching synchronous condition. In this way, synchronism is attained very quickly and a shift can be completed very quickly.

*Alternate structures*

The alternate structure shown in Figure 3 is substantially identical in construction to that described hereinabove with respect to the structure shown in Figure 1, except for variations in the energy control system. The operator actuated valve 79, instead of being located on the shift lever 81 for manual operation, is here located adjacent to the clutch pedal 82 for operation thereby. The valve 79 is positioned so that the clutch pedal 82 is substantially depressed and the clutch disengaged before the pedal engages the valve 79 and operates same. This may be accomplished, as shown, by spacing the valve 79 from the clutch pedal 82 or by providing a conventional lost motion linkage (not shown) between said clutch pedal 82 and the valve 79.

The operation of the alternate structure shown in Figure 3 differs from that shown in Figures 1 and 2 in that the operator actuated valve 79, which serves the same purpose as the valve 70, of Figure 1, is operated by the clutch pedal 82 instead of the operator's hand. As in the case of the structure shown in Figure 1, operation of the valve 79 in Figure 3, will not effect an application of the countershaft brake 11 until the valve 66a has also been operated by movement of the transmission into its neutral position. Accordingly, the operator of the vehicle can fully depress the clutch pedal 82, thereby connecting the conduit 83 to the conduit 84 through the valve 79, without applying the countershaft brake. Also, it will be seen that by a slight release of the clutch pedal 82 the valve 79 may be released so that its exhaust port will be connected to the conduit 83 and will block the conduit 84, without re-engaging the clutch 58. Thus, the alternate energy control system 80 is also arranged so that if desired, the countershaft brake 11 can be released while the transmission 13 is in neutral and either with or without re-engaging the clutch 58.

Figure 4:
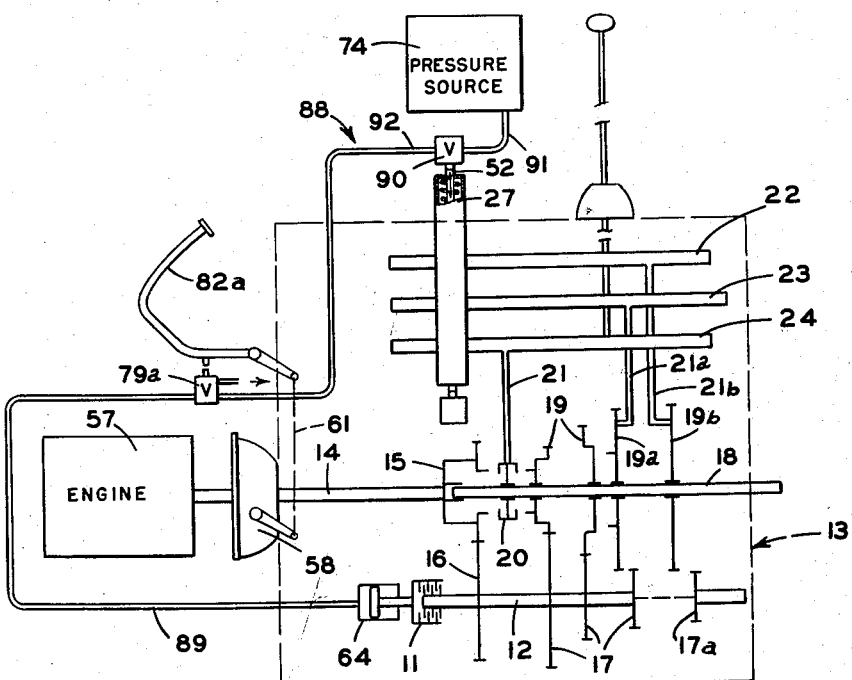
Figure 4 is a schematic representation of a further alternate embodiment of the invention.

The further modified control system 88, shown in Figure 4, differs from the structure shown in Figure 3 in that the operator actuated, three-way valve 79a, which is operated by the clutch pedal 82a, is here connected by the conduit 89 directly to the pressure cylinder 64. The valve 90, operable by the transmission mechanism, is in this embodiment a normally open on-off valve and is arranged for controlling the flow of pressure fluid from the source 74 into the conduit 92. Retraction of the pin 52 of the actuator mechanism 27, as the latter moved out of the neutral position, permits closure of the valve 90 and blocks communication between the conduits 91 and 92.

As in the case of the structure shown in Figure 3, the operator actuated three-way valve 79a may be operated by the clutch pedal 82 as, and if, desired after the clutch 58 becomes fully disengaged. Following this, when the transmission 13 enters neutral, the valve 90 is opened and the brake 11 is automatically applied. Upon moving the transmission out of neutral, the valve 90 is again closed and the brake 11 is released.

While this arrangement is acceptable, it is somewhat less desirable than the other forms shown since, unless pressure is held in the line 92 between operations, it will be slower in action than said other forms. This is because pressure fluid released by valve 90 has to pass through conduit 92, valve 79a and conduit 89 to reach the brake cylinder 64, whereas pressure fluid released by the valves 66 or 66a (Figures 1 and 3) needs to pass only through the conduit 65 to reach the brake cylinder. On the other hand, if pressure is retained in the conduit 92 (Figure 4) and if the conduit 89 is short compared to the conduit 92, this arrangement could result in premature application of the brake in a subsequent operation.

Although particular, preferred embodiments of the invention have been disclosed in detail hereinabove for illustrative purposes, it will be recognized that variations or modifications thereof, which lie within the scope of this invention, are fully contemplated unless specifically stated to the contrary in the appended claims.

I claim:

1. In control mechanism for a speed decelerating device associated with an engine connected element of a change gear system, the combination comprising: power means effective when energized to operate said device; a source of power for said means; a pair of energy flow controls serially connected between said source and said power means; means controllable by the operator for rendering a first of said pair of controls into energy passing and energy blocking positions and means automatically responsive to the position of said change gear system with respect to neutral for rendering the other of said controls into energy passing condition when said system is in neutral position and for rendering it into energy blocking condition when said system is out of neutral position.

2. In control mechanism for a brake associated with an engine connected element of a change gear system, the combination comprising: power means effective when energized to apply said brake; a source of power for said means; a pair of energy controlling devices serially connected between said source and said brake; means controllable by the operator for rendering a first of said pair of devices into energy conducting and energy non-conducting positions and means automatically responsive to the position of said change gear system with respect to neutral for rendering the other of said devices into energy conducting condition when said system is in neutral position and for rendering it into non-conducting condition when said system is out of neutral position.

3. The device defined in claim 2 including control means mounted on the shift lever of the change gear system and means responsive to said control means for determining the position of said first energy conducting device.

4. The device defined in claim 2 including control means responsive to a position of a clutch pedal and means responsive to said control means for controlling the position of said first energy conducting device in response to the position of such clutch pedal.

5. The device defined in claim 2 wherein said change gear system includes a plurality of shift rods, and control means responsive to the position of said shift rods with respect to each other for controlling the position of said second energy conducting device.

6. Apparatus for controlling the application of a brake to the engine connected parts of a change gear system, the combination comprising: a brake operatively associated with an element of the engine connected side of said change gear system and actuating means for said brake; a manually controllable valve positioned for control by an operator; an automatically controllable valve and means responsive to the condition of the said system with respect to its neutral position for opening said valve when said system is in its neutral position and for closing said valve when said system is out of its neutral position; a source of pressure fluid and means connecting said valves in series with respect to each other and further means for connecting said valves in series between said source and said actuating means; whereby one of said valves may be opened at the will of the operator but the other of said valves is opened and the brake energized only when said system is in its neutral position.

7. In a control mechanism for a speed decelerating device associated with an engine connected element of a change speed gear system, the combination comprising: power means connected to said device for controlling operation thereof; a source of power for said power means; a pair of power flow controls connected in series between said source and said power means, said flow controls each being positionable in a first position wherein said source is connectible to said power means and a second position wherein said source is not connectible to said power means; means operable by an operator for placing a first of said pair of controls in either said first or said second position; means automatically responsive to the position of said change speed gear system with respect to neutral for placing the other of said pair of controls in either said first or said second position, said other control being placed in one of said positions when said change speed gear system is in neutral and being placed in the other position when said change speed gear system is out of neutral position.

8. Control mechanism for operating a brake associated with an engine connected element of a change speed gear transmission, the combination comprising: a piston and cylinder device connected to said brake for operating said brake when fluid under pressure is admitted thereinto; a source of fluid under pressure; a manually controllable valve positioned for control by an operator; an automatically controllable valve and means responsive to the condition of said transmission with respect to its neutral position for opening said valve when said transmission is in its neutral position and for closing said valve when said transmission is out of its neutral position; means connecting said valves in series with each other and between said source and said piston and cylinder device whereby the manually controllable valve may be opened at the will of an operator but said automatically controllable valve is open and the brake is operated only when said transmission is in its neutral position.

9. A mechanism according to claim 8 including shift rods connected to the gears of said transmission for controlling the setting thereof and wherein said means responsive to the condition of said transmission includes an actuator operable by said shift rods and connected to said automatically controllable valve for moving same to its open position when the transmission is in neutral and for moving same to its closed position when the transmission is out of neutral.

10. In a change speed gear transmission having an input shaft, an output shaft, a countershaft, and intermeshing gearing on said shafts for transmitting power from one shaft to another, said countershaft having a brake thereon for decelerating the speed of rotation thereof, the combination comprising: a piston and cylinder device connected to said brake and operative to apply said brake to said shaft to decelerate same; a source of fluid pressure; a manually controllable valve positioned for control by an operator; an automatically controllable valve; said valves being connected in series between said source and said piston and cylinder device, said valves each being positionable in an open position wherein said source communicates with said piston and cylinder device and a closed position wherein said source is blocked from communication with said device and said device is connected to exhaust; means automatically responsive to the condition of said transmission with respect to its neutral position for opening said automatically controllable valve when said transmission is in its neutral position and for closing said automatically controllable valve when said transmission is out of its neutral position whereby the manually controllable valve may be opened at the will of an operator but said automatically controllable valve is open and the brake is operated only when said transmission is in its neutral position.

References Cited in the file of this patent

UNITED STATES PATENTS 2,550,545   Findley _____ Apr. 24, 1951